United States Patent
Brinkerhoff et al.

(10) Patent No.: US 7,851,732 B2
(45) Date of Patent: Dec. 14, 2010

(54) SYSTEM AND METHOD FOR ATTITUDE CONTROL OF A FLIGHT VEHICLE USING PITCH-OVER THRUSTERS

(75) Inventors: Robert S. Brinkerhoff, Tucson, AZ (US); Michael J. Mahnken, Way Oro Valley, AZ (US); Richard D. Loehr, Tucson, AZ (US); James M Cook, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 929 days.

(21) Appl. No.: 11/470,900

(22) Filed: Sep. 7, 2006

(65) Prior Publication Data

US 2009/0072076 A1    Mar. 19, 2009

Related U.S. Application Data

(60) Provisional application No. 60/780,895, filed on Mar. 7, 2006.

(51) Int. Cl.
*F42B 15/01* (2006.01)
*F42B 10/00* (2006.01)
*F42B 15/00* (2006.01)

(52) U.S. Cl. .............. 244/3.21; 244/3.1; 244/3.15; 244/3.22; 244/158.1; 244/171.1

(58) Field of Classification Search ........... 244/3.1–3.3, 244/158.1, 158.4–159.3, 171.1–171.5; 89/1.11
See application file for complete search history.

(56) References Cited

U.S. PATENT DOCUMENTS

| | | | | | |
|---|---|---|---|---|---|
| 3,612,442 | A | * | 10/1971 | Chisel | 244/3.22 |
| 3,726,496 | A | * | 4/1973 | Leonard | 244/3.22 |
| 3,843,076 | A | * | 10/1974 | King et al. | 244/3.16 |
| 3,977,629 | A | * | 8/1976 | Tubeuf | 244/3.22 |
| 3,977,633 | A | * | 8/1976 | Keigler et al. | 244/3.22 |
| 4,408,735 | A | * | 10/1983 | Metz | 244/3.22 |
| 4,413,795 | A | * | 11/1983 | Ryan | 244/3.22 |
| 4,463,921 | A | * | 8/1984 | Metz | 244/3.22 |
| 4,568,040 | A | * | 2/1986 | Metz | 244/3.22 |
| 4,928,906 | A | * | 5/1990 | Sturm | 244/3.22 |
| 5,054,712 | A | * | 10/1991 | Bar et al. | 244/3.22 |
| 5,062,593 | A | * | 11/1991 | Goddard et al. | 244/3.22 |
| 5,123,611 | A | * | 6/1992 | Morgand | 244/3.22 |
| 5,129,604 | A | * | 7/1992 | Bagley | 244/3.22 |
| 5,158,246 | A | | 10/1992 | Anderson | |
| 5,238,204 | A | * | 8/1993 | Metz | 244/3.15 |
| 5,259,569 | A | | 11/1993 | Waymeyer et al. | |
| 5,273,237 | A | * | 12/1993 | Guyton et al. | 244/3.22 |
| 5,433,399 | A | | 7/1995 | Becker et al. | |

(Continued)

FOREIGN PATENT DOCUMENTS

GB    2265342 A  *  9/1993

*Primary Examiner*—Bernarr E Gregory
(74) *Attorney, Agent, or Firm*—Eric A. Gifford

(57) ABSTRACT

A reliable and inexpensive attitude control system uses a plurality of pitch-over thrusters to perform rapid and precise attitude maneuvers for a flight vehicle. The pitch-over thrusters create rotational moments that directly pitch and yaw the flight vehicle. The use of very simple thrusters and control techniques provides for a reliable and cost effective solution. The ability to perform overlapping pitch and yaw maneuvers with single-shot fixed-impulse thrusters provides for high-speed maneuverability.

23 Claims, 11 Drawing Sheets

U.S. PATENT DOCUMENTS

| | | |
|---|---|---|
| 5,456,425 A | 10/1995 | Morris et al. |
| 5,456,429 A * | 10/1995 | Mayersak .................. 244/3.22 |
| 5,647,558 A * | 7/1997 | Linick ....................... 244/3.11 |
| 6,138,945 A * | 10/2000 | Biggers et al. ............. 244/3.22 |
| 6,178,741 B1 * | 1/2001 | Nelson et al. ............. 244/3.22 |
| 6,347,763 B1 * | 2/2002 | Harkins et al. ............ 244/3.21 |
| 6,367,735 B1 * | 4/2002 | Folsom et al. ............. 244/3.22 |
| 6,629,668 B1 * | 10/2003 | Grau et al. ................. 244/3.22 |
| 6,695,251 B2 * | 2/2004 | Rodden et al. ............. 244/3.21 |
| 6,752,351 B2 * | 6/2004 | John ......................... 244/3.22 |
| 6,889,935 B2 * | 5/2005 | O'Dwyer ................... 244/3.21 |
| 7,004,423 B2 * | 2/2006 | Folsom et al. ............. 244/3.22 |
| 7,416,154 B2 * | 8/2008 | Bittle et al. ................ 244/3.22 |
| 2003/0042355 A1 * | 3/2003 | Rodden et al. ............. 244/3.21 |
| 2003/0197088 A1 * | 10/2003 | Folsom et al. ............. 244/3.22 |
| 2004/0084564 A1 * | 5/2004 | John ......................... 244/3.22 |
| 2005/0103925 A1 * | 5/2005 | Folsom et al. ............. 244/3.21 |

* cited by examiner

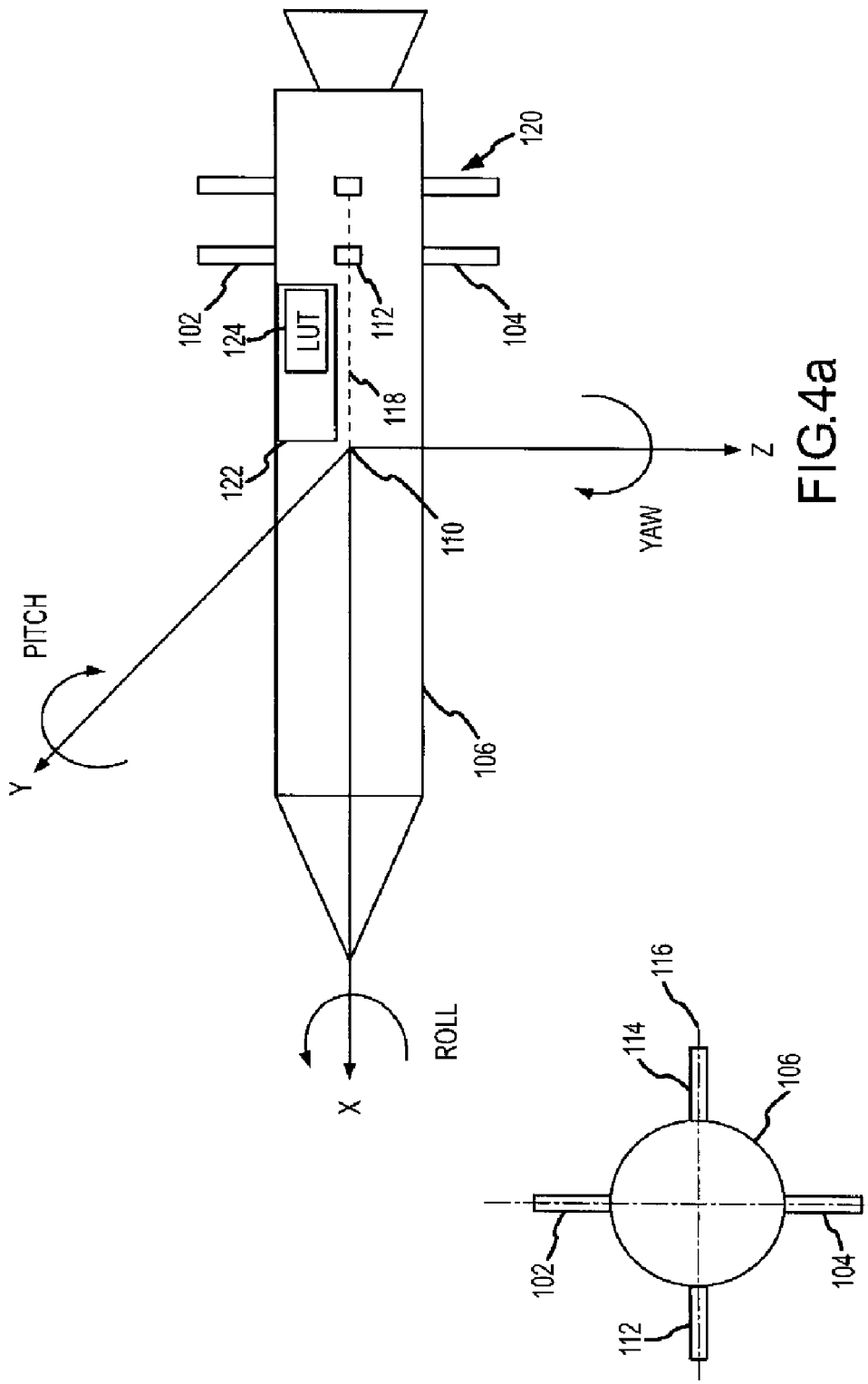

| | YAW (deg) | START PITCH | START YAW | STOP PITCH | STOP YAW |
|---|---|---|---|---|---|
| 1 | 0<=Ψ<=45 | T3 | T2 | T1 | T4 |
| 2 | 45<=Ψ<90 | T2 | T3 | T4 | T1 |
| 3 | 90<=Ψ<135 | T2 | T1 | T4 | T3 |
| 4 | 135<=Ψ<180 | T1 | T2 | T3 | T4 |
| 5 | -180<=Ψ<-135 | T1 | T4 | T3 | T2 |
| 6 | -135<=Ψ<-90 | T4 | T1 | T2 | T3 |
| 7 | -90<=Ψ<-45 | T4 | T3 | T2 | T1 |
| 8 | -45<=Ψ<0 | T3 | T4 | T1 | T2 |

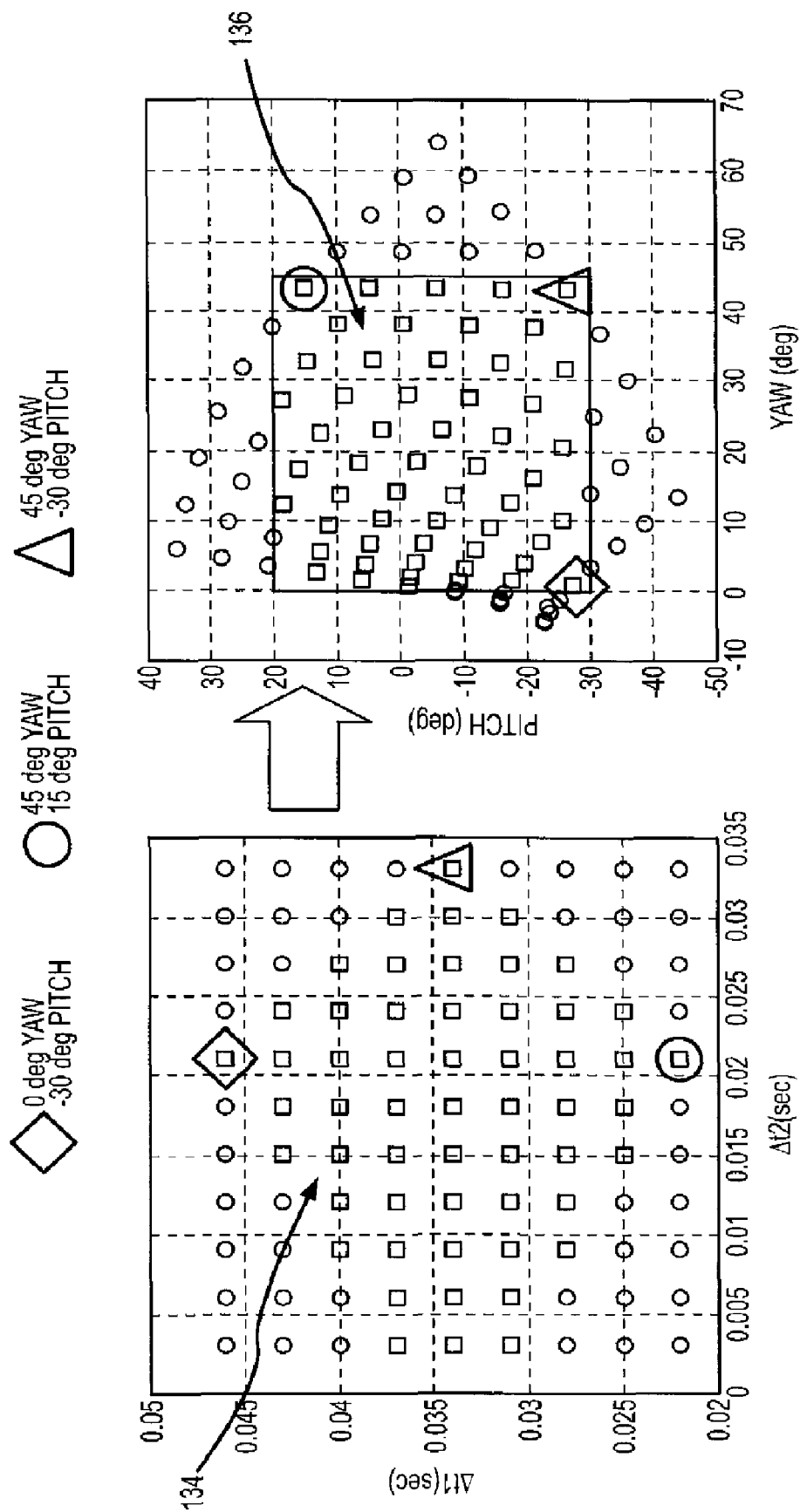

SYSTEM AND METHOD FOR ATTITUDE CONTROL OF A FLIGHT VEHICLE USING PITCH-OVER THRUSTERS

CROSS-REFERENCE TO RELATED APPLICATIONS

This application claims benefit of priority under 35 U.S.C. 119(e) to U.S. Provisional Application No. 60/780,895 entitled "All Aspect Pitchover Using Divert Thrusters" and filed on Mar. 7, 2006 the entire contents of which are incorporated by reference.

BACKGROUND OF THE INVENTION

1. Field of the Invention

This invention relates to a system and method of attitude control for flight vehicles including missiles, kill vehicles and space craft.

2. Description of the Related Art

Attitude control systems are used to maneuver flight vehicles such as a missile, kill vehicle (KV) or space craft. One approach is to control moveable fins or other airfoils to produce the force vector required to pitch and yaw the flight vehicle. This approach is relatively inexpensive but is not capable of maneuvering the vehicle with both speed and precision, has moving parts that reduce reliability and will not work in space. Another approach is to use active thrusters. This approach is considerably more expensive and has its own reliability concerns due to the complexity of the thrusters and closed-loop control systems. Active thrusters can produce larger force vectors to reduce the response time of any maneuver.

As shown in FIG. 1, a missile 10 is oriented with its body axis 12 along the x-axis. The missile's rocket motor 14 produces a thrust vector 16 that ordinarily imparts a force on the missile along its body axis. An articulated nozzle 18 turns thrust vector 16 to impart a pitch (rotation about the y-axis) or yaw (rotation about the z-ax) moment to the missile. An IMU 20 measures the attitude of the missile and provides active feedback control to articulated nozzle 18. This is known as "Thrust Vector Control" and is typically used with tactical missiles during flight to provide relatively gross and slow attitude control. A related approach is to fix nozzle 18 but place turning vanes inside the nozzle to turn the thrust vector. This is known as "Jet Vane Control". Both techniques require moving parts, are relatively expensive solutions and are generally incapable of executing tight turning radius maneuvers.

Another approach is to use a combination of roll-control thrusters and pitch-over thrusters as illustrated in FIGS. 2a-2c and 3a-3c. A pair of roll-control thrusters 30 and 32 are mounted on opposite sides of a missile 34 so that their thrust vectors produce a rotational moment that "rolls" the missile around its body axis in either direction. A pair of pitch-over thrusters 36 and 38 are mounted on opposite sides of missile 34 in the pitch plane and offset from the missile's center of gravity so that their thrust vectors produce a rotational moment that "pitches" the missile. Because the missile's moment of inertia to pitch is much greater than its moment of inertia to roll, the pitch thrusters are generally capable of producing substantially more thrust than are the roll-control thrusters. Both types of thrusters are typically fixed amplitude and variable pulse-width to control the total applied force. Although the roll-control and pitch-over thrusters are shown on the missile orthogonal to each other, they can be aligned or have any desired orientation with respect to each other because they act independently.

To maneuver missile 34 from its current heading to an attitude 40, the roll-control thrusters 30 and 32 and than the pitch-over thrusters 36 and 38 are fired in sequence. Because the "roll" and "pitch" maneuvers are performed sequentially, any error in the "roll" maneuver will induce a large error in the "pitch". Consequently, active closed-loop control is used for both maneuvers. As shown in FIGS. 2a and 3, roll-control thruster 30 is fired producing thrust vector 42 that rolls the missile in a counter-clockwise direction. In an active closed-loop control system, the IMU will constantly measure the roll angle and feed it back to the attitude controller, which in turn will either continue to fire thruster 30 to continue rolling the missile or, if the missile has rolled too far, fire thruster 32 produces thrust vector 44 to roll it back. Once the roll maneuver has stabilized so that the plane of pitch-over thrusters 36 and 38 is aligned with desired attitude 40, pitch-over thruster 36 is fired producing a thrust vector 46 that rotates the missile around its center of gravity in the pitch plane. The attitude controller actively controls pitch-over thrusters 36 and 38, which produce thrust vectors 46 and 48, to stabilize the orientation of the missile the missile along attitude 40. Although this approach is widely used for attitude control in large, expensive missile systems, the attitude control system is expensive and less reliable on account of the pulse-width modulated thrusters and active control system and relatively slow on account of the sequential "roll" and "pitch" maneuvers.

In modern weapons systems and space craft demands are being placed on the attitude control systems to be able to perform attitude maneuvers very quickly and precisely with high reliability and at low cost. Smaller and lower cost flight vehicles are being planned for deployment in much higher volumes that are placing higher demands on performance at lower costs. The known approaches for attitude control cannot meet the cost-performance requirements of these systems.

SUMMARY OF THE INVENTION

The present invention provides a reliable and inexpensive attitude control system that is capable of performing rapid and precise attitude maneuvers for a flight vehicle.

The attitude control system includes at least four pitch-over thrusters on the flight vehicle and displaced from the vehicle center of gravity so that their thrust vectors produce rotational moments to directly pitch and yaw the flight vehicle. A fire controller is configured to issue start firing commands to a first set of the thrusters to slew the flight vehicle and to issue stop firing commands to a second set of the thrusters to stop the flight vehicle at a specified pitch and yaw to complete the attitude control maneuver.

In an exemplary embodiment, first and second pairs of pitch-over thrusters are placed on the vehicle in pitch and yaw planes, respectively. Each thruster suitably produces a single fixed-impulse thrust vector when fired. Multiple sets of pitch-over thrusters can be provided if multiple attitude control maneuvers are required. Knowing the inertial properties of the flight vehicle and the fixed-impulse of the thrust vectors, start and stop firing times can be calculated and stored in a look-up table for different attitude control maneuvers. The fire controller looks up the start times for a particular maneuver and issues the start firing commands to one of the thrusters in each pair. If operating open-loop, the fire controller simply fires the other thruster in each pair at the prescribed stop time. If closed-loop, the fire controller receives measurements of the pitch and yaw as the vehicle slews and makes adjustments to the prescribed stop times. The pitch and yaw The pitch and yaw maneuvers can be performed sequentially or overlapped in time to reduce the response time of the attitude control maneuver.

Although this approach is applicable to provide attitude control for any flight vehicle including all types of missiles, kill-vehicles and space craft, it is particularly applicable for smaller highly maneuverable cost-constrained missile systems. One such system is an "Active Protection System" or APS in which a missile system is integrated with a vehicle such as a HumVee or armored personnel carrier to provide defensive counter-measures against possible attack. The missiles must be able to perform attitude control maneuvers very quickly and very precisely to overcome potential threats, must be highly reliable and inexpensive. A typical APS would include a threat detection system for detecting and tracking a target and providing a launch command and pitch and yaw commands to the missile(s) for a desired attitude to the target. Each missile has a main thruster for providing thrust a long a body axis of the missile and at least four pitch-over thrusters displaced from the missile center of gravity whose thrust vectors produce rotational moments to directly pitch and yaw the missile. A launch thruster launches the missile out of the vehicle upon receipt of the launch command. A fire controller receives the pitch and yaw commands and issues start firing commands to a first set of said thrusters to slew the missile and to issue stop firing commands to a second set of said thrusters to stop the missile at the specified pitch and yaw to achieve the desired attitude to the target. Once the missile is oriented at the target, the fire controller issues a command to ignite the main thruster to fire the missile at the target. An implementation that uses single-shot fixed-impulse thrusters and an open-loop fire controller is much less expensive and more reliable than current attitude control systems. The capability to actively pitch and yaw the missile simultaneously allows the missile to complete the attitude control maneuver in no more than 200 ms and typically less than 100 ms.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4*a*-4*b* are diagrams illustrating attitude control using pitch-over thrusters in accordance with the present invention;

FIGS. 6*a*-6*b* are diagrams illustrating the construction of a thruster firing table for one region;

DETAILED DESCRIPTION OF THE INVENTION

Figure 1:
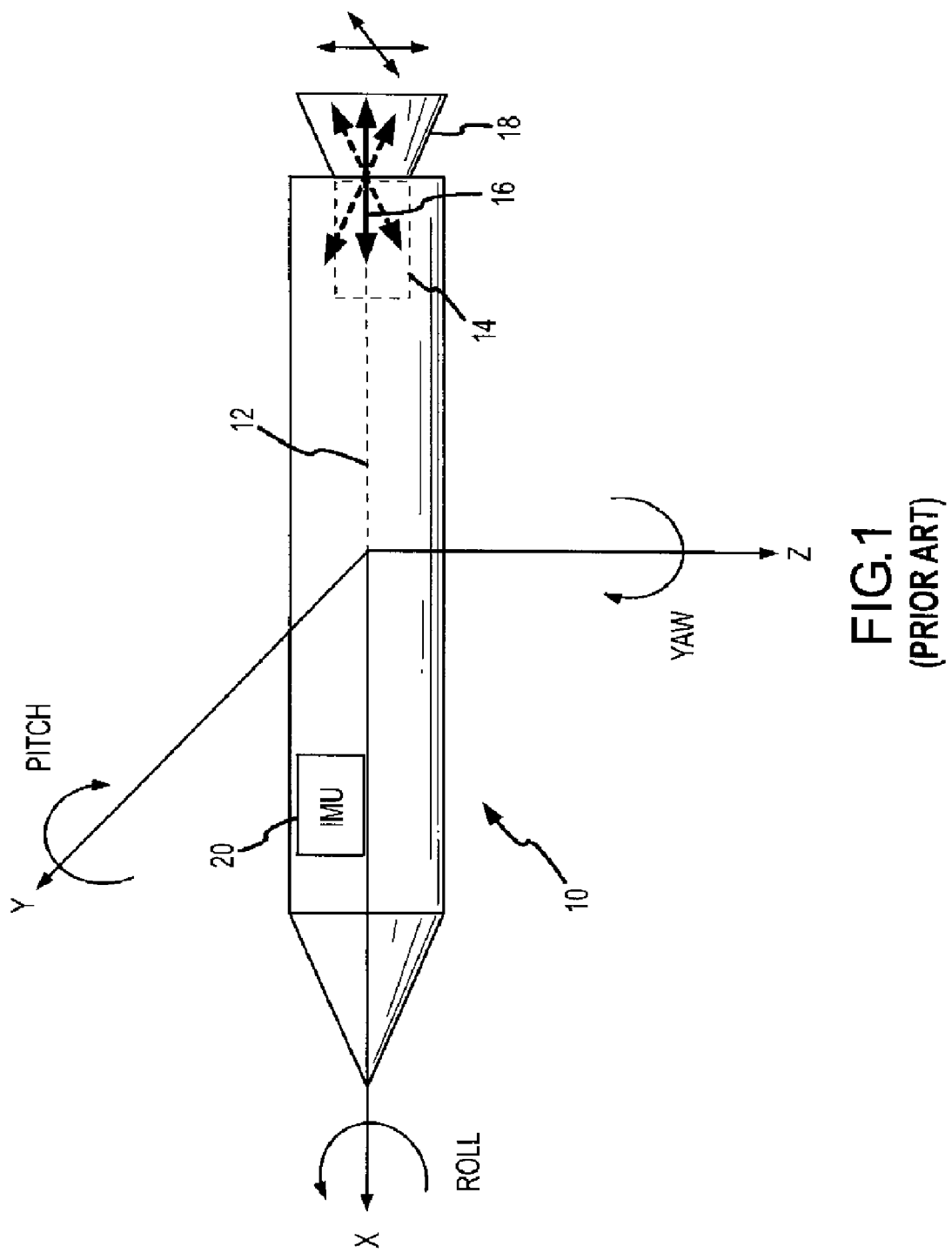
FIG. 1, as described above, is a diagram illustrating Thrust Vector Control of a missile using an articulated nozzle.
Figure 2C:
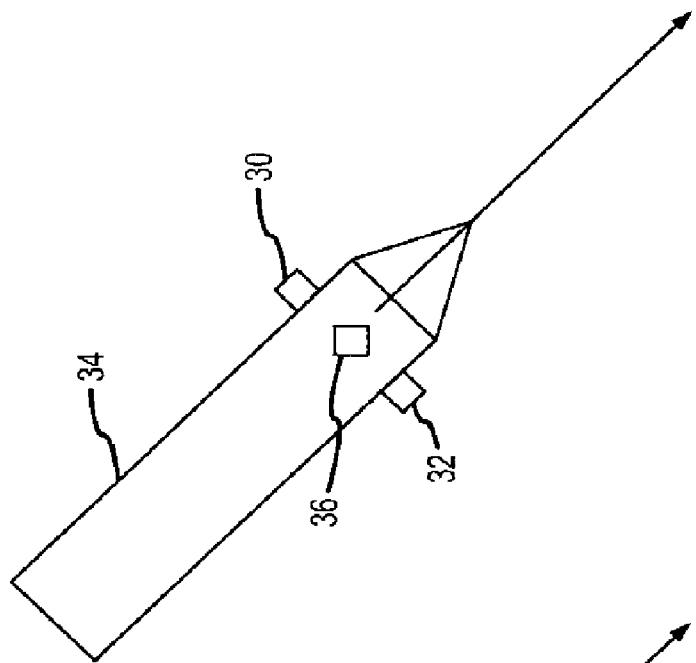
FIGS. 2*a*-2*c*, as described above, are diagrams illustrating independent roll/pitch control of a missile.
Figure 2B:
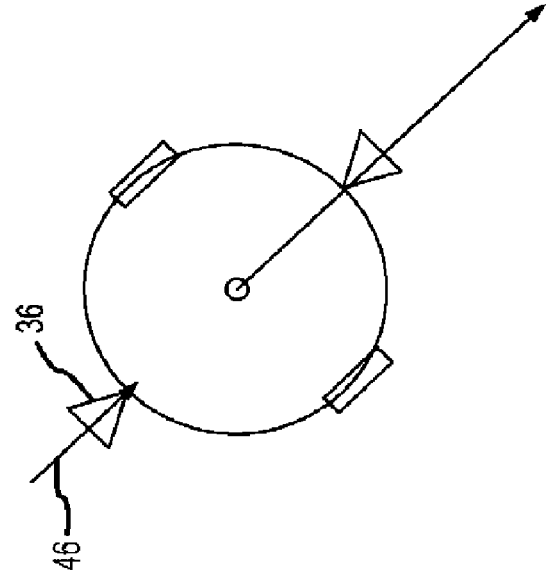
Figure 2A:
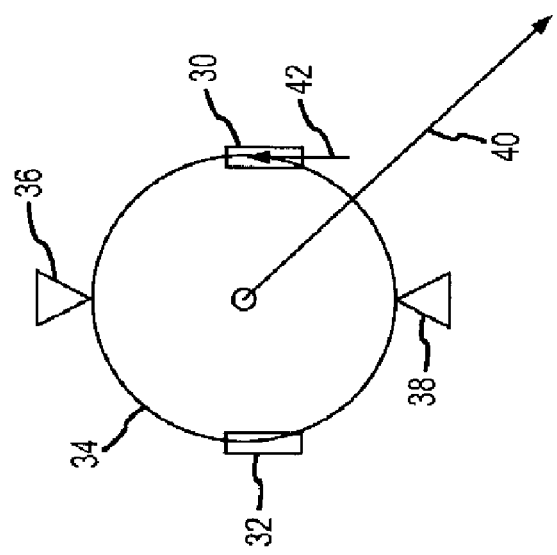
Figure 3:
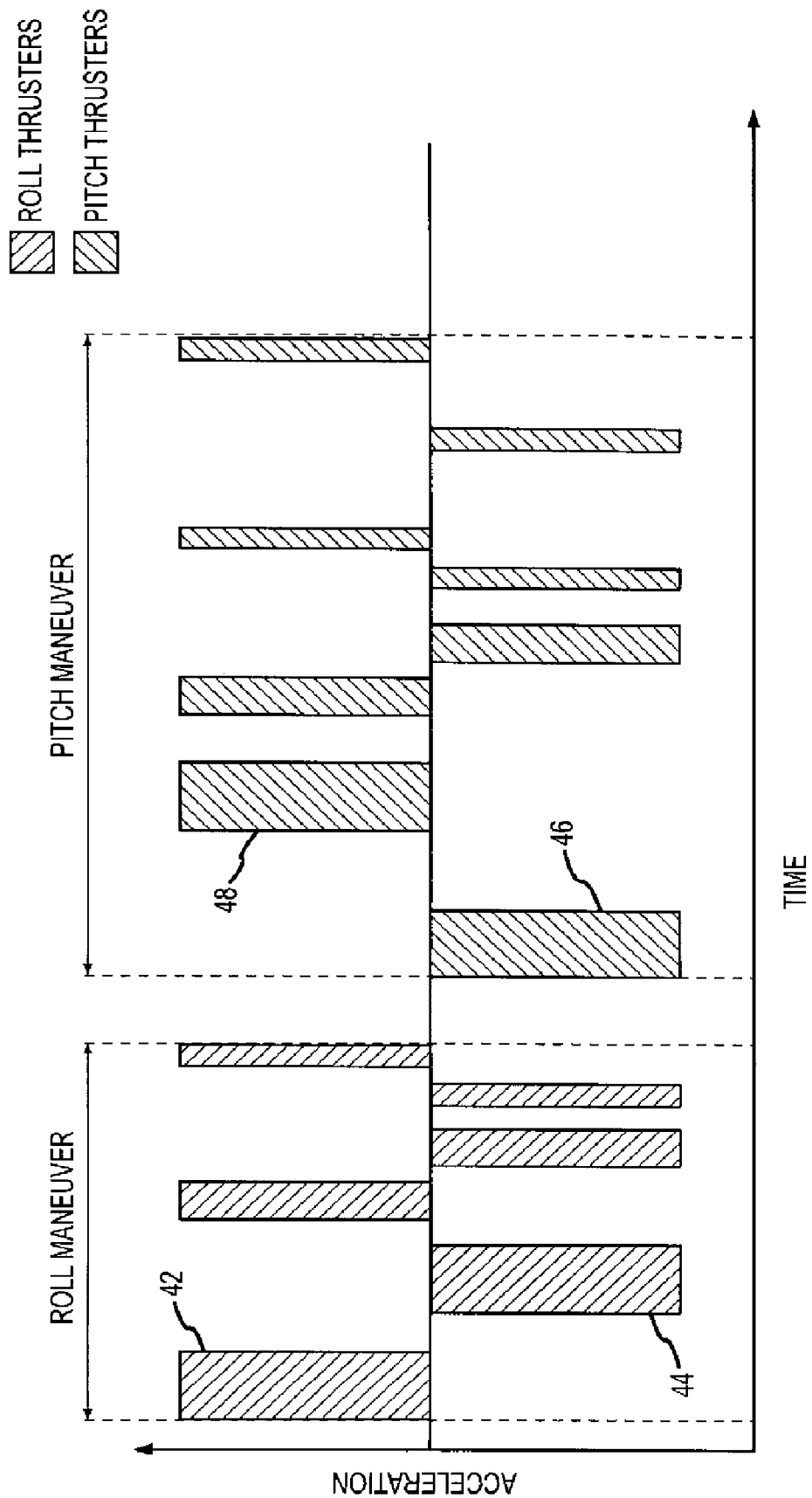
FIG. 3 is a plot of a representative closed-loop firing sequence for independent roll/pitch control shown in FIGS. 2*a*-2*c*.
Figures 5A, 5B:
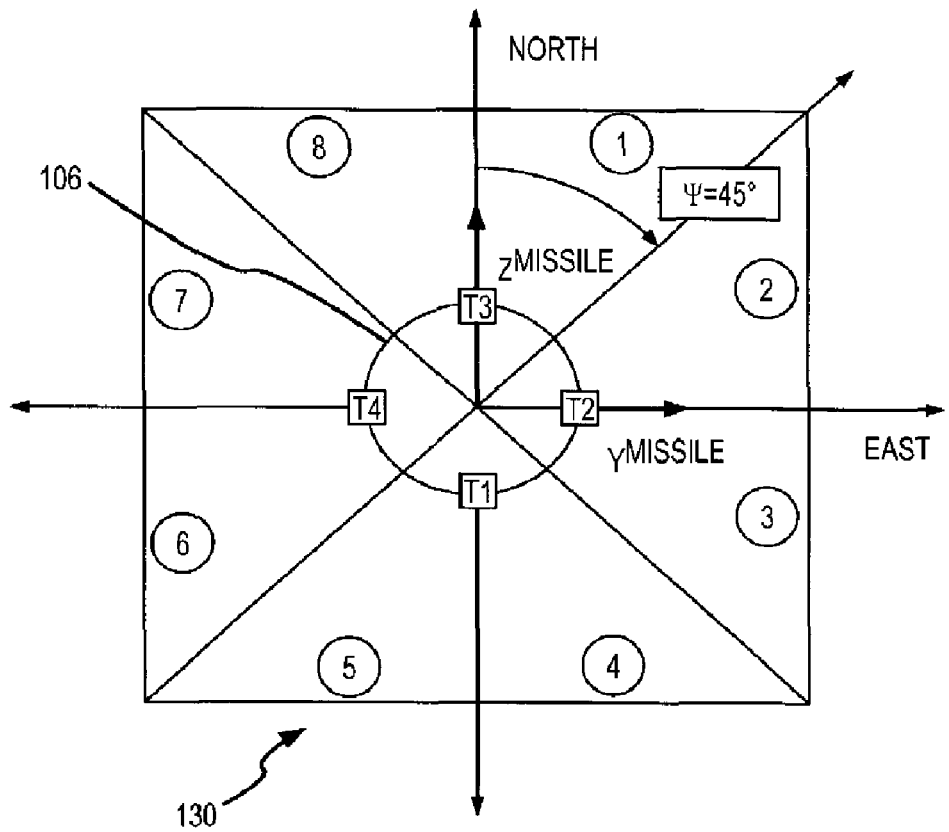
FIGS. 5*a*-5*b* are diagrams illustrating the symmetry of the start and stop firing command times for two pair of fixed-impulse thrusters disposed in pitch and yaw planes, respectively.

The present invention provides a reliable and inexpensive attitude control system that is capable of performing rapid and precise attitude maneuvers for a flight vehicle. The system uses a plurality of pitch-over thrusters to create rotational moments that directly pitch and yaw the flight vehicle. The use of very simple thrusters and control techniques provides for a reliable and cost effective solution. The ability to perform overlapping pitch and yaw maneuvers with single-shot fixed-impulse thrusters provides for high-speed maneuverability.

In an exemplary embodiment, a first pair of pitch-over thrusters 102 and 104 are mounted on a missile 106 in a pitch plane 108 and displaced from the missile's center of gravity 110. Similarly, a second pair of pitch-over thrusters 112 and 114 are mounted on missile 106 in a yaw plane 116 and displaced from the missile's center of gravity 110. Note, the pitch and yaw planes are defined with respect to the missile heading and roll angle and will change constantly. The terminology is used to convey that the two pairs of thrusters are orthogonal and that at a given roll angle and heading one pair will pitch the missile and the other pair will yaw the missile to perform the attitude control maneuver.

When fired, pitch-over thrusters 102 and 104 and 112 and 114 generate thrust vectors that produce rotational moments to directly pitch and yaw the missile, respectively. The two pair of orthogonally oriented pitch-over thrusters is the minimal and simplest configuration that can directly pitch and yaw the missile. The thrust vectors preferably intercept the missile body axis 118 so as not to induce roll. However, more complicated configurations with additional thrusters could be implemented to perform the same function. To improve reliability and keep costs low, each thruster is preferably very simple. For example, a configuration of fixed-impulse thrusters is highly effective and simplifies attitude control. Because the moments of inertia in the pitch and yaw planes of a typical missile are similar, the pitch and yaw thrusters may have the same fixed-impulse response. In many applications, single-shot fixed-impulse thrusters provide a highly reliable and inexpensive solution to perform a single attitude control maneuver. To accommodate multiple control maneuvers, an additional set of pitch-over thrusters 120 can be mounted on the missile.

A fire controller 122 issues start firing commands to a first set of said thrusters (e.g. thrusters 104 and 112) to slew the flight vehicle and to issue stop firing commands to a second set of said thrusters (e.g. thrusters 102 and 114) to stop the flight vehicle at the specified pitch and yaw to perform the attitude control maneuver. To stop the flight vehicle, the sum of the rotational moments in each of the pitch and yaw planes must be zero. Assuming the distance from the thruster to the center of gravity is the same, the total impulse of the start and stop thrusters must be equal. To stop the flight vehicle at the specified attitude (pitch, yaw), the timing of the firing sequence must be well controlled, If the actual delays between start and stop thrusters are longer than the specified delays, the missile will over-rotate. Conversely, if the actual delays are shorter than the specified delays the missile will under-rotate. The greater the duration between firing the start and stop thrusters the greater the missile will pitch or yaw.

Knowing the inertial properties of the missile and the fixed-impulse of the thrust vectors, start and stop firing times can be calculated and stored in a look-up table (LUT) 124 for different attitude control maneuvers. The fire controller looks up the start times for a particular maneuver and issues the start firing commands to one of the thrusters in each pair. If open-loop, the fire controller simply fires the other thruster in each pair at the prescribed stop time, If closed-loop, the fire controller receives measurements of the pitch and yaw as the vehicle stews and makes an adjustment to the prescribed stop time. The pitch and yaw maneuvers can be performed sequentially or simultaneously to reduce the response time of the attitude control maneuver. In an alternate but equivalent embodiment, the LUT may store only a delta between the start and stop firing times. In this case, when the fire controller receives a control command it simply fires all of the start thrusters and then at the respective deltas, fires the stop thrusters.

An exemplary embodiment for constructing LUT 124 is illustrated in FIGS. 5a-5b and 6a-6b. In this embodiment, it is assumed that each of the pitch-over thrusters produce the same fixed-impulse and rotational moments. These symmetry properties greatly streamline the calculation of the LUT and the amount of memory required to store the LUT. The missile 106 and pitch-over thrusters T1 102, T2 114, T3 104 and T4 112 are shown in a coordinate frame 130, which is divided into regions 1, 2, 3 . . . 8 covering 360° of yaw. Each region covers 45° of yaw and 180° of pitch in this representation. A table 132 maps the thrusters that are used to start and stop the pitch and yaw for each region. Region 1 covers a yaw between 0 and 45°. In this region, thrusters T2 and T4 are fired to yaw the missile to the desired angle and thrusters T3 and T1 are fired to pitch the missile to the desired angle. Because of the symmetry properties, only the thruster firing sequences for missile attitudes in Region 1 need be calculated. All other firing sequences are permutations of the firing sequence used for Region 1. In cases where the missile is asymmetric it may be necessary to calculate thruster firing sequences for the full 360° of yaw.

The firing sequence for Region 1 is constructed by firing thrusters T1, T2, T3 and T4 with different ($\Delta t1$, $\Delta t2$) where $\Delta t1=t3-t1$ and $\Delta t2=t2-t4$ which span Region 1 as shown in FIG. 6a. Each data point ($\Delta t1$, $\Delta t2$) 134 has an associated (Pitch, Yaw) that is stored but not shown. To be useful the LUT should provide the firing sequence ($\Delta t1$, $\Delta t2$) for a specified (Pitch, Yaw). This is accomplished by mapping the data points 134 from $\Delta t1$ vs. $\Delta t2$ to pitch vs. yaw data points 136 as shown in FIG. 6b. To form the final LUT, these data points are interpolated to provide a uniform grid at a desired resolution.

Figure 7B:
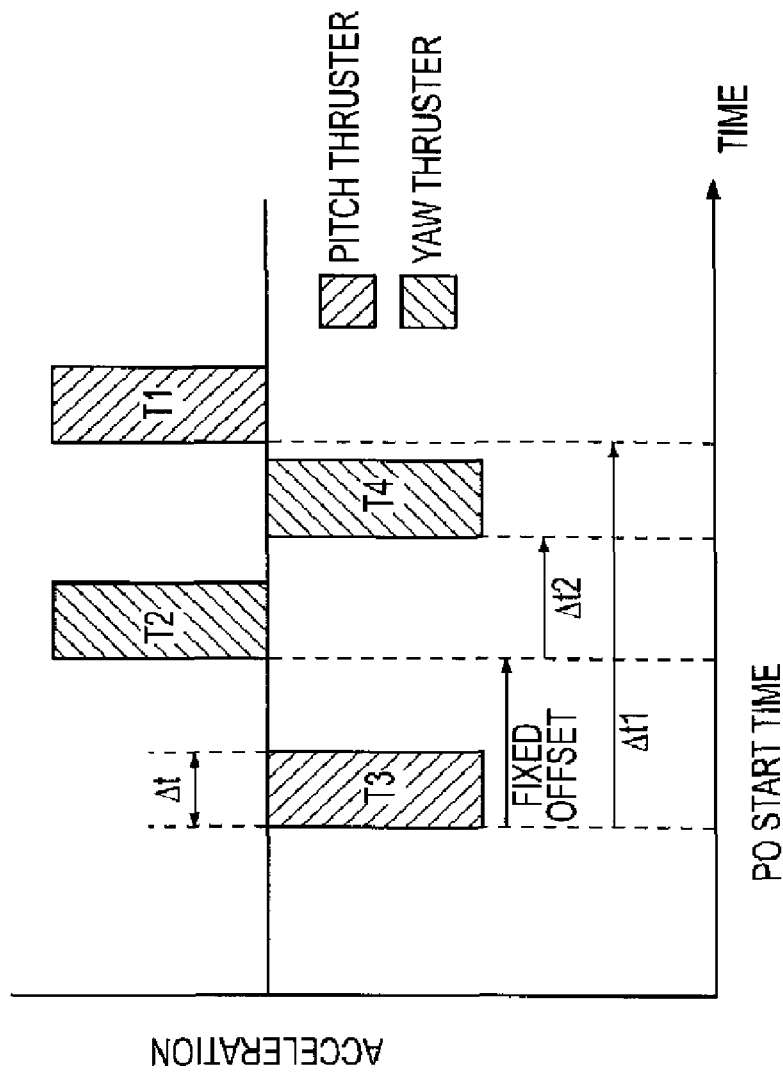
FIGS. 7*a*-7*c* are diagrams illustrating the start and stop firing commands for fixed-impulse thrusters for a particular attitude control maneuver operating open-loop and closed-loop.
Figure 7A:
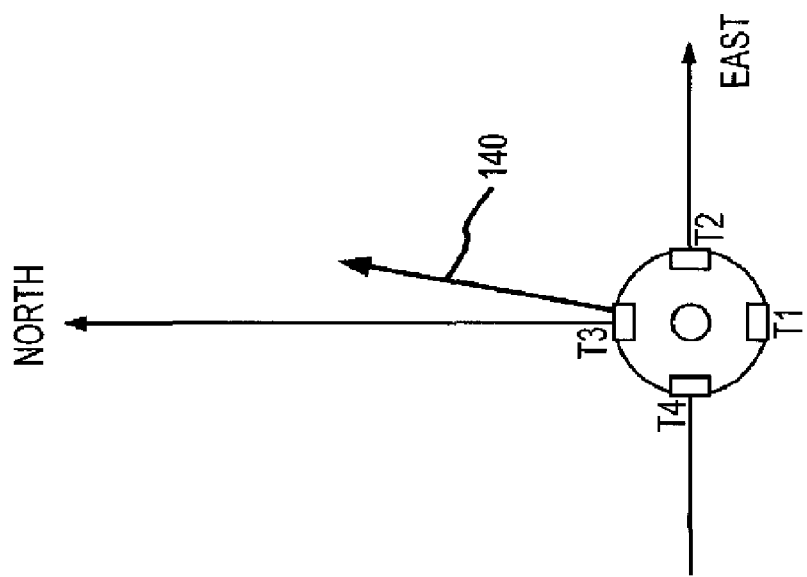
Figure 7C:
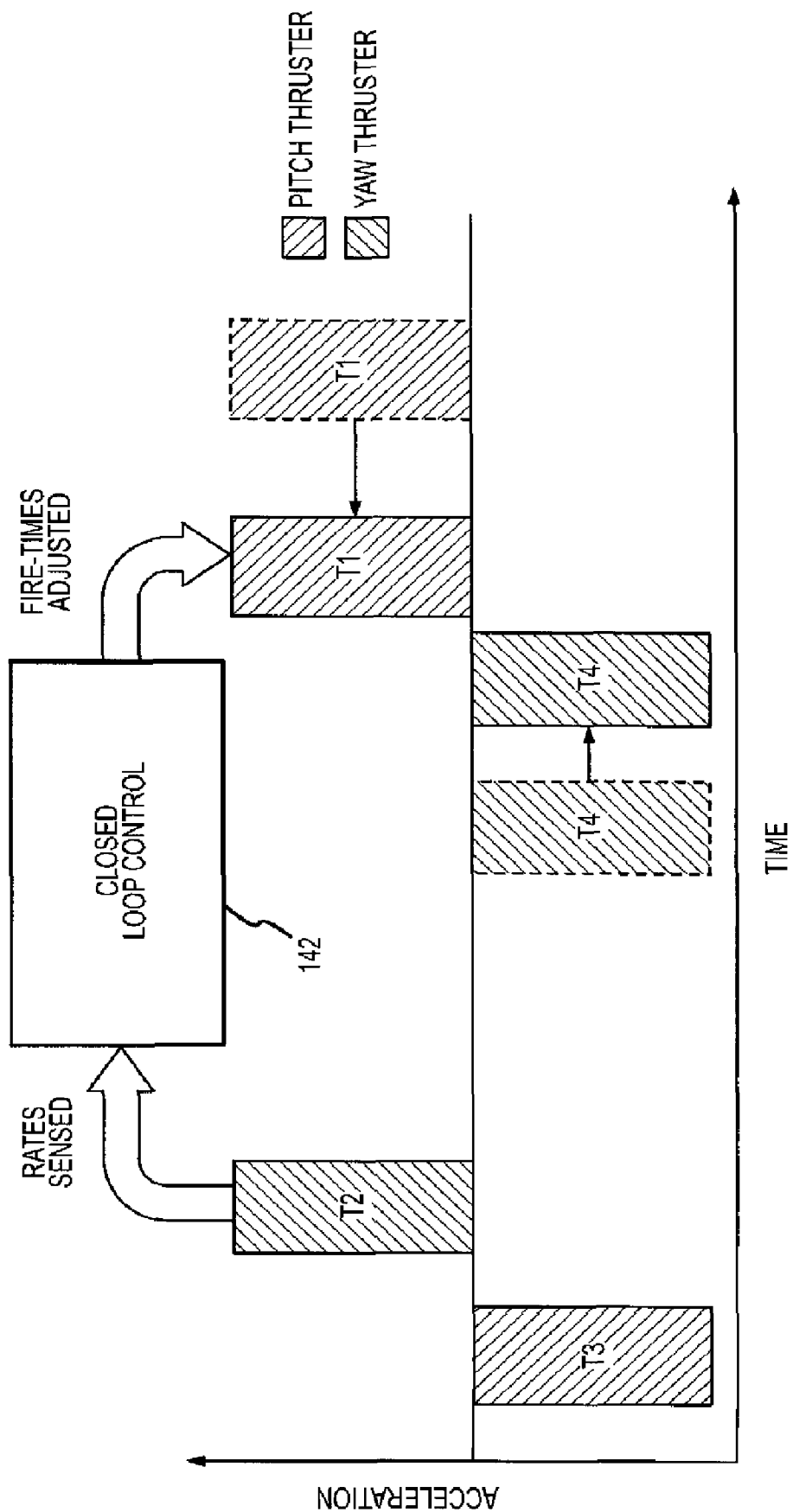

As mentioned above, the fire controller can operate either "open" or "closed" loop, which trade off simplicity and cost versus precision. To execute an attitude control maneuver 140 as shown in FIG. 7a, thrusters T1 and T4 will be fired to pitch and yaw the missile, respectively. Thrusters T3 and T2 will be fired to stop the respective pitch and yaw maneuvers. As shown in FIG. 7b, for open-loop control the fire controller simply looks up the four start and stop times for T1, T2, T3 and T4 and issues the firing commands accordingly. As shown each of the thrusters produces the same fixed-impulse thruster vector. In this example, the start time for T2 is offset from T1 but they could be fired simultaneously. Because the attitude control maneuver 140 requires a larger pitch maneuver $\Delta t1$ is considerably longer than $\Delta t2$. In many systems, the pulse width of the thrust vector is less than 50 ms and nominally 1-10 ms. The complete firing sequence typically takes less than 200 ms and nominally 100 ms. As shown in FIG. 7c, for closed-loop control 142, the guidance system or possibly the fire controller receives measurements of the pitch and yaw rates caused by firing thrusters T3 and T2 and revises the fire-time solution by adjusting the stop times for T1 and T4, respectively. These adjustments may be caused by non-uniformities in the thrusters or variations in the missile's moments of inertia, As opposed to conventional closed-loop solutions that control the pulse-width of the thrusters and iteratively fire opposing thrusters, the proposed closed-loop solution makes a single adjustment to the thruster stop time. This simplified closed-loop approach can be used with the single-shot fixed-impulse thrusters.

Figure 8A:
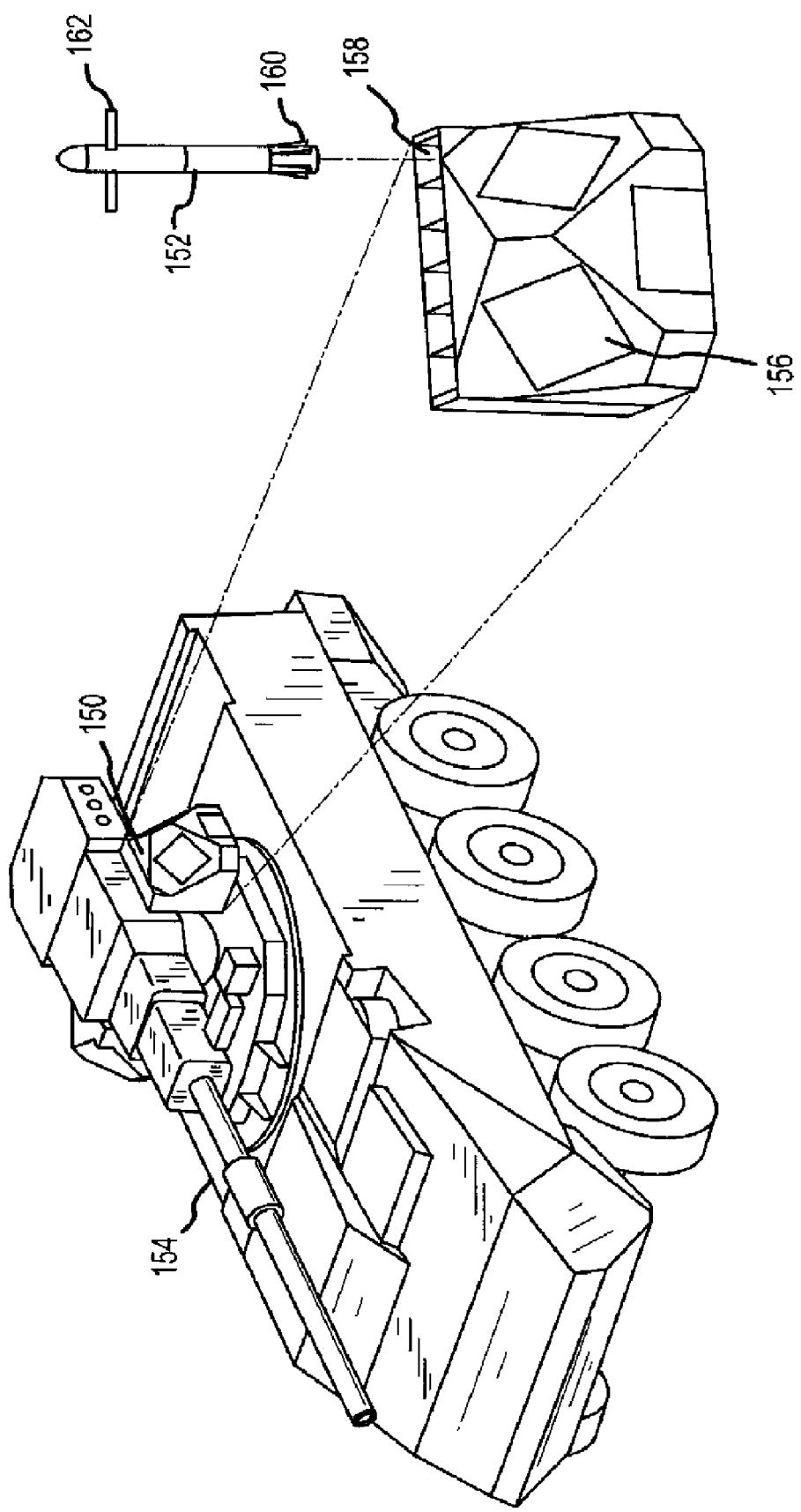
FIGS. 8*a*-8*c* are diagrams of an active protection system (APS).

Although this approach is applicable to provide attitude control for any flight vehicle including all types of missiles, kill-vehicles and space craft, it is particularly applicable for smaller highly maneuverable cost-constrained missile systems. One such system is an "Active Protection System" or APS 150 shown in FIG. 8a in which a missile system is integrated with a vehicle 154 such as a HumVee or armored personnel carrier to provide defensive counter-measures against possible attack. The missiles 152 must be able to perform attitude control maneuvers very quickly and very precisely to overcome potential threats, must be highly reliable and inexpensive. A typical APS would include the missile 152, a threat detection system (TDS) 156 for detecting and tracking a target and providing a launch command and pitch and yaw commands to the missile(s) for a desired attitude to the target, and a launch thruster 158 to launch the missile out of the vehicle upon receipt of the launch command. Each missile 152 has a main thruster 160 for providing thrust a long a body axis of the missile, at least four pitch-over thrusters 162 displaced from the missile center of gravity whose thrust vectors produce rotational moments to directly pitch and yaw the missile, and a fire controller to issue the firing commands.

Figure 8B:
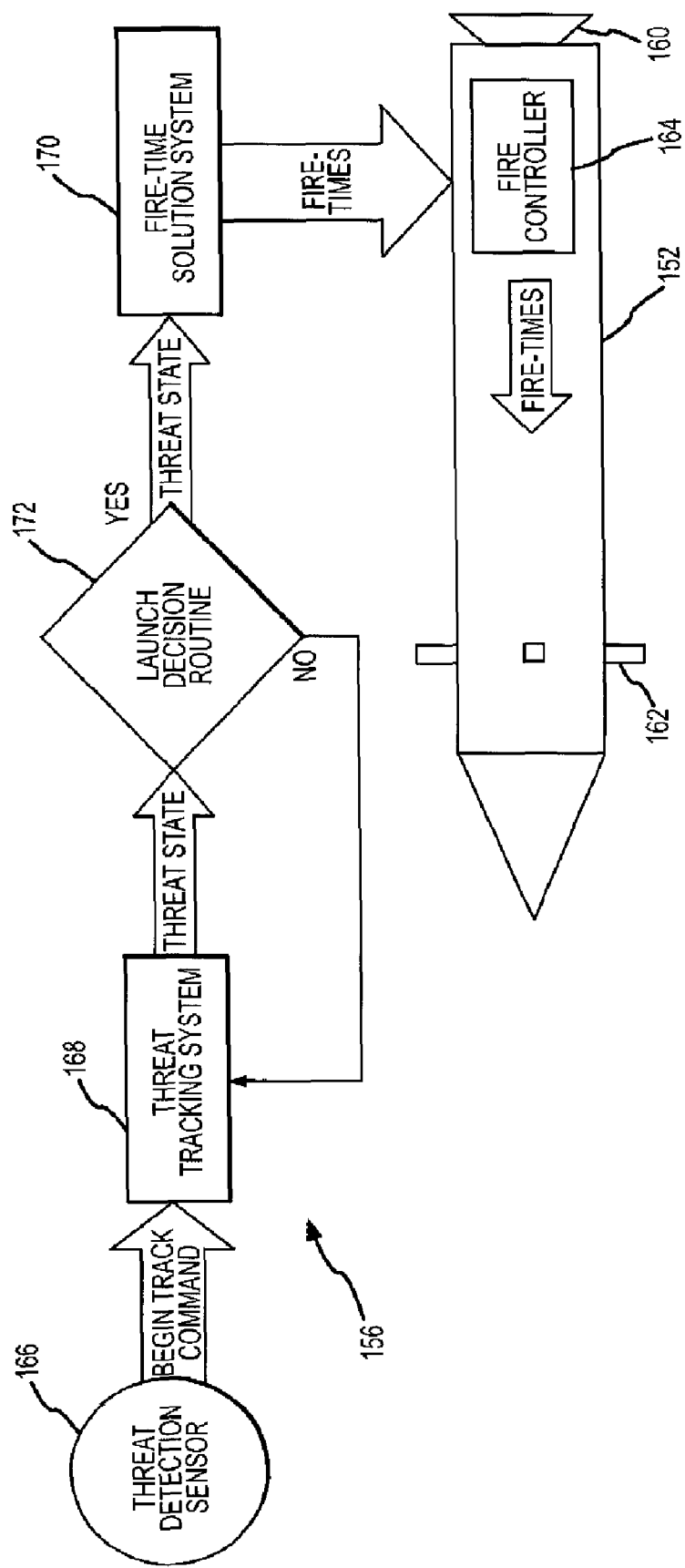

As shown in FIG. 8b, in an exemplary embodiment threat detection system 156 includes a threat detection sensor 166, a threat tracking system 168 and fire-time solution system 170. Threat detection sensor 166 sends a "begin track command" and its sensed data to threat tracking system 168, which analyzes the data and outputs a "threat state". This process continues until a launch decision routine 172 decides that a real threat exists and a missile 152 should be launched to counter the threat. The "threat state" is passed to the fire-time solution system 170, which determines which available missile to launch, when to launch, when to initiate the pitch-over maneuver and the specific start and stop commands for the firing sequence. The fire-times to initiate pitchover and the specific start and stop commands are loaded into the missile's fire control system.

Figure 8C:
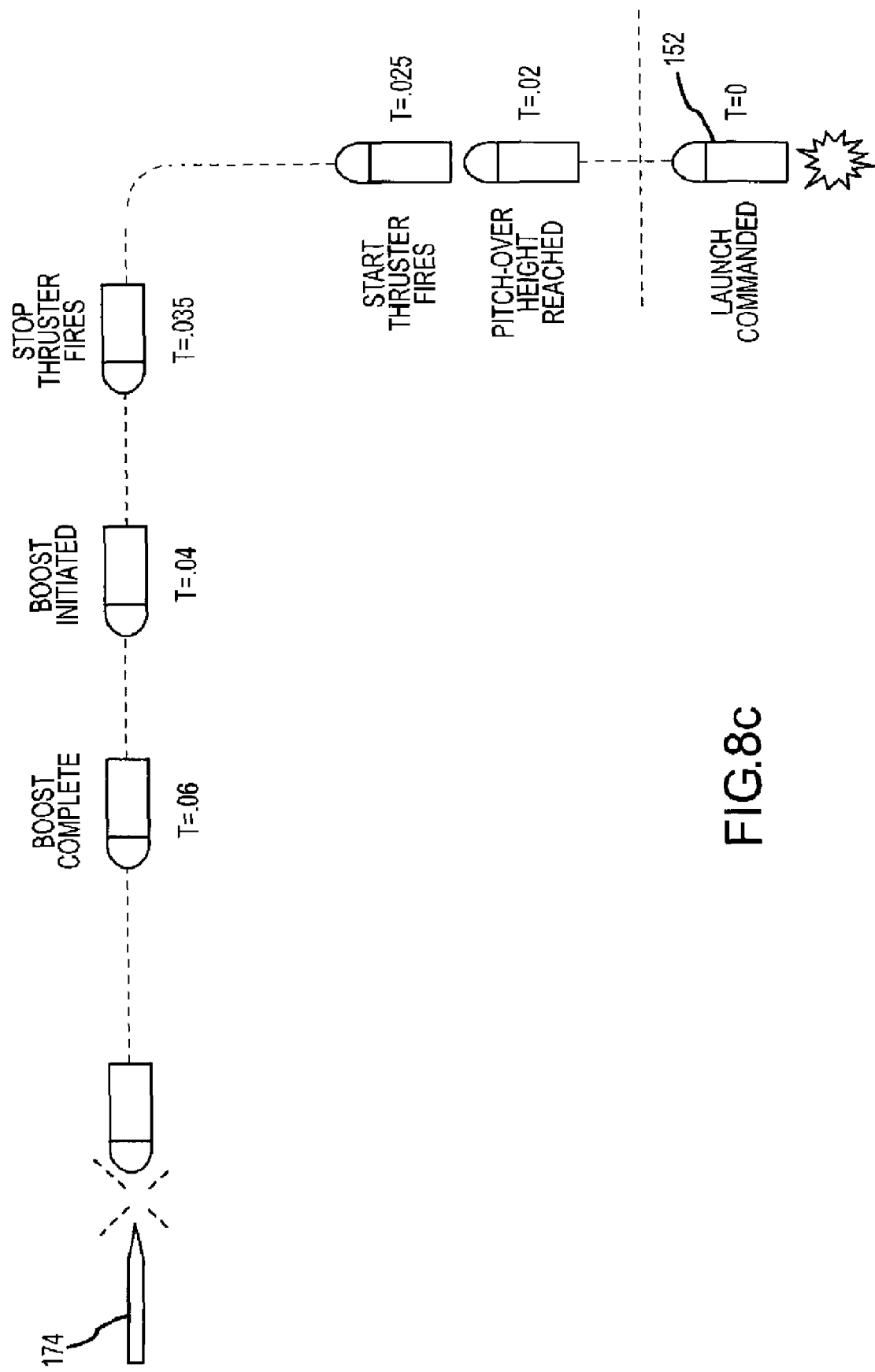

As shown in FIG. 8c, at T=0 the Fire-Time Solution System 170 issues the launch command causing launch thruster 158 to 'pop' missile 152 up above the vehicle. Once the pitch-over height is reached (T=0.02 s), a fire controller 164 issues the start firing commands to a first set of said thrusters to pitch and yaw the missile (T=0.25 s) and issues the stop firing commands to a second set of said thrusters to stop the missile at the specified pitch and yaw to achieve the desired attitude to the target (T=0.035 s). If closed-loop control is employed, the adjustment to the stop times must be made within the window of about 100 ms. Once the missile is oriented at the target, the fire controller issues a command to ignite the main thruster to initiate boost to fire the missile at the target (T=0.4). Boost is completed at T=0.6 seconds with intercept of target 174 occurring at a range of approximately 100 feet in about 0.16 seconds from launch to intercept. An implementation that uses single-shot fixed-impulse thrusters and an open-loop fire controller is much less expensive and more reliable than current attitude control systems. The capability to actively pitch and yaw the missile simultaneously allows the missile to complete the attitude control maneuver in no more than 200 ms and typically less than 100 ms.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An attitude control system for a flight vehicle selected from a missile, kill vehicle (KV) or space craft, comprising:
at least four thrusters on the flight vehicle and displaced from the vehicle center of gravity, said thruster generating thrust vectors with a fixed impulse that produce rotational moments to directly pitch and yaw the flight vehicle; and
a fire controller configured to issue start firing commands to a first set of said thrusters to slew the flight vehicle and to issue stop firing commands to a second set of said thrusters to stop the flight vehicle at a specified pitch and yaw.

2. The attitude control system of claim 1, wherein all of the thrusters generate thrust vectors with the same fixed impulse.

3. The attitude control system of claim 1, wherein each thruster can generate a single fixed impulse thrust vector.

4. The attitude control system of claim 3, further comprising multiple sets of said at least four thrusters to perform respective attitude control maneuvers.

5. An attitude control system-for a flight vehicle selected from a missile, kill vehicle (KV) or space craft, comprising:
at least four thrusters on the flight vehicle and displaced from the vehicle center of gravity, said thrusters including a first pair of thrusters whose thrust vectors are collinear in a pitch plane and a second pair of thrusters whose thrust vectors are collinear in a yaw plane that produce rotational moments to directly pitch and yaw the flight vehicle; and
a fire controller configured to issue start firing commands to a first set of said thrusters to slew the flight vehicle and to issue stop firing commands to a second set of said thrusters to stop the flight vehicle at a specified pitch and yaw.

6. An attitude control system for a flight vehicle selected from a missile, kill vehicle (KV) or space craft, comprising:
at least four thrusters on the flight vehicle and displaced from the vehicle center of gravity so that their thrust vectors produce rotational moments to directly pitch and yaw the flight vehicle; and
a fire controller configured to store a table of start and stop times for a plurality of yaw and pitch maneuvers for issuing start and stop firing commands, for a specified maneuver said fire controller issues start firing commands to a first set of said thrusters to slew the flight vehicle and issues stop firing commands to a second set of said thrusters to stop the flight vehicle at a specified pitch and yaw.

7. The attitude control system of claim 6, wherein the fire controller operates open loop and issues the start and stop firing commands at the times stored in the table for the specified pitch and yaw.

8. The attitude control system of claim 6, wherein the fire controller issues the start firing commands at the times stored in the table for the specified pitch and yaw, receives measurements of the pitch and yaw as the vehicle slews and adjusts the stop times stored in the table to issue the stop firing commands.

9. An attitude control system for a flight vehicle selected from a missile, kill vehicle (KV) or space craft, comprising:
at least four thrusters on the flight vehicle and displaced from the vehicle center of gravity so that their thrust vectors produce rotational moments to directly pitch and yaw the flight vehicle; and
a fire controller configured to issue start firing commands to a first set of said thrusters to slew the flight vehicle so that the pitch and yaw slewing overlap at least partially in time and to issue stop firing commands to a second set of said thrusters to stop the flight vehicle at a specified pitch and yaw.

10. An attitude control system for a flight vehicle selected from a missile, kill vehicle (KV) or space craft, comprising:
a first pair of thrusters on the flight vehicle and displaced from the vehicle center of gravity, each said thruster being configured to generate a single thrust vector with a fixed-impulse to produce a rotational moment to slew the vehicle in a pitch plane;
a second pair of thrusters on the flight vehicle and displaced from the vehicle center of gravity, each said thruster being configured to generate a single thrust vector with a fixed-impulse to produce a rotational moment to slew the vehicle in a yaw plane;
a look-up table that stores start and stop firing times for said first and second pairs of thrusters for a plurality of pitch and yaw maneuvers; and
a fire controller that looks up the start and stop firing times for a specified pitch and yaw maneuver, issues start firing commands to one of the thrusters in each of said first and second pairs at said start firing times to slew the flight vehicle, and issues stop firing commands to the other one of said thrusters in each of said first and second pairs based on said stop firing times to stop the flight vehicle at the specified pitch and yaw maneuver.

11. The attitude control system of claim 10, wherein the fire controller operates open loop and issues the stop firing commands at the times stored in the table for the specified pitch and yaw maneuver.

12. The attitude control system of claim 10, wherein the fire controller receives measurements of the pitch and yaw as the vehicle slews and adjusts the stop times stored in the table to issue the stop firing commands.

13. The attitude control system of claim 10, wherein fire controller issues the start firing commands so that the pitch and yaw slewing overlap at least partially in time.

14. The attitude control system of claim 10, wherein the pitch and yaw maneuver from the first start firing command to the last stop firing command takes less than 200 ms.

15. An active protection system, comprising:
a threat detection system for detecting and tracking a target and providing a launch command and pitch and yaw commands for a desired attitude to the target;
a missile having a main thruster for providing thrust, a long a body axis of the missile and at least four thrusters displaced from the missile center of gravity whose thrust vectors produce rotational moments to directly pitch and yaw the missile;
a launch thruster to launch the missile upon receipt of the launch command; and
a fire controller on the missile configured to issue start firing commands to a first set of said thrusters to slew the missile and to issue stop firing commands to a second set of said thrusters to stop the missile at a specified pitch and yaw to achieve the desired attitude to the target, said fire controller then issuing a command to ignite the main thruster to fire the missile along the desired attitude to the target.

16. The active protection system of claim 15, wherein the thrusters generate thrust vectors with a fixed-impulse, said fire controller further comprising a look-up table that stores start and stop firing times for said thrusters for a plurality of pitch and yaw commands.

17. The active protection system of claim 16, wherein said at least four thrusters includes a first and second pairs of thrusters that slew the missile in pitch and yaw planes, respectively, said look-up table storing one start and one stop time for each pair.

18. The active protection system of claim 16, wherein the fire controller operates open loop and issues the stop firing commands at the times stored in the table for the specified pitch and yaw maneuver.

19. The attitude control system of claim 16, wherein the fire controller receives measurements of the pitch and yaw as the vehicle slews and adjusts the stop times stored in the table to issue the stop firing commands.

20. The attitude control system of claim 16, wherein fire controller issues the start firing commands so that the pitch and yaw slewing overlap at least partially in time.

21. An attitude control system for a flight vehicle selected from a missile, kill vehicle (KV) or space craft, comprising:
   at least four thrusters on the flight vehicle and displaced from the vehicle center of gravity so that their thrust vectors produce rotational moments to directly pitch and yaw the flight vehicle in pitch and yaw planes, respectively; and
   a fire controller configured to issue start firing commands to a first set of said thrusters to slew the flight vehicle and to issue stop firing commands to a second set of said thrusters so that the sum of the rotational moments in each of the pitch and yaw planes is zero to stop the flight vehicle at a specified pitch and yaw.

22. The attitude control system of claim 21, wherein all of the thrusters are displaced the same distance from the center of gravity, the total impulse of the first set of thrusters is equal to the total impulse of the second set of thrusters.

23. The attitude control system of claim 22, wherein each said thruster produces the same fixed-impulse.

* * * * *